Sept. 25, 1951 S. W. EVENSEN 2,569,157
METHOD OF MOLDING STRUCTURAL SLABS OF CEMENT AND FIBER
Filed July 8, 1949

Inventor:
Sverre Wilfred Evensen
By: Edward F. Jurow
Atty

UNITED STATES PATENT OFFICE 2,569,157

METHOD OF MOLDING STRUCTURAL SLABS OF CEMENT AND FIBER

Sverre Wilfred Evensen, Fredrikstad, Norway

Application July 8, 1949, Serial No. 103,636
In Norway December 2, 1948

4 Claims. (Cl. 25—155)

The present invention relates to a method of manufacturing constructional plates and the like which consist of wood shavings, excelsior or similar strips of fibres of a substantial length, the cross section of such strips having a greater width than thickness. Such strips by means of cement and water or other suitable bonding material are formed into plates suitable for constructional purposes.

It has been previously proposed, and also practiced, to manufacture such plates by mixing the fiber material in question, say excelsior or straw, with a suitable bonding agent, for example cement and water, and, if desired, additional constituents making the final product resistive to fire, water, frost, fungi and other decay, whereafter such mixture is formed into disc-like bodies which are subjected to pressure at right angles to the larger face surfaces of said bodies, and are maintained under pressure until the bonding substance has set sufficiently, so that the plate formed will maintain the shape and dimensions obtained by such operation.

In this manner constructional plates have been obtained which were utilizable as insulation boards, and which have other several purposes.

The applicant has found, that by a very simple manner of working it is possible to manufacture constructional plates which have quite astonishing properties as compared with plates manufactured by the methods hitherto known.

The primary feature of the invention consists in that the liquid mixture confined in a mold is subjected to pressure which is directed substantially parallel to the large or face surfaces of the finished plate. In this manner the organic fiber material will tumble or tilt over and in the finished product will act somewhat as "planks standing on edge." Thus the finished plate will have a denser structure and, in addition to having heat insulating properties, it will also have increased mechanical strength so that the plate may be used to form intermediate walls, outer walls, floors or ceilings or parts thereof, or, in general, sustaining constructional members in small buildings, or may be used as insulating boards in connection with brick- or béton walls. Thus it has been found that such plates may be used directly as intermediate walls in buildings, and that sinks or other similar heavy devices may be secured directly thereto by screws or the like. Of course, such intermediate walls would, if desired, be provided with a cover of wall paper or a coat of paint.

In the manufacture of insulating plates or boards of the type above mentioned as used in the prior art, viz. by pressing from the large face surfaces of the plates there will, of course, occur a tumbling or tilting over of those strips of material which are not already positioned with their large surfaces substantially at right angles to the direction of the pressure. But in such case the major portion of the strips will become placed with their large surfaces parallel to the large face surfaces of the finished plate, whereas they— when the method of this invention is used—will have their large surfaces situated more or less at right angles to the large face surfaces of the finished plate. It is believed that this is the reason why plates produced in accordance with the present invention are so much stronger than plates produced according to known methods, although the plates manufactured in accordance with the present invention still have remarkable insulating properties.

For the production of plates in accordance with the present invention a certain quantity or volume of the fiber material in question, to which has been added bonding agent and eventually other desired additional substances, is placed in a mold, whereafter this mass is subjected to pressure parallel or substantially parallel to the large face surfaces of the finished plate. Such pressure may be exerted from one, two or four sides, and may take place by such means that on one side of the finished plate, there will be formed a groove and on the other side a tongue. Such groove and tongue may be advantageous when the plates are to be combined to form intermediate walls and the like.

During the pressing operation the molds may be vertically positioned, several molds being placed adjacent to each other, and the material to be pressed being introduced into the mold or molds from above, viz. from one of the narrow sides of the plate to be produced. By this procedure however, it is difficult to obtain a sufficiently even distribution of the material in the mold, for which reason it is preferred to place the molds horizontally, and introduce the material from the broad or large face surface of the plate to be produced.

Since in the preferred method the pressure will have to act through a longer distance of material than in the method where the molds stand on edge, I have found that in order to obtain a substantially uniform structure in all portions of the finished plate, it is desirable to add an excess of material at the centre portion of the plate than at the end portions thereof. Also, for this reason, it is preferable to use horizontally arranged pressure molds, which are filled from a large face thereof. For filling of the centre portion of the mold there may suitably be made use of an auxiliary frame and of an auxiliary pressure piston, which will be fully described below.

For more or less filling up of the spaces between the fiber strips of the plate, the mass to be pressed may have added thereto some "short" material, such as saw dust, wood chips and the like. Such shorter additional stuff is preferably added near the external surfaces of the plate, whereas the inner part of the plate receives no such addition, or to a lesser degree only.

For a better understanding of the invention the method will now be described in connection with the drawing, illustrating an embodiment of the invention;

Figure 1:
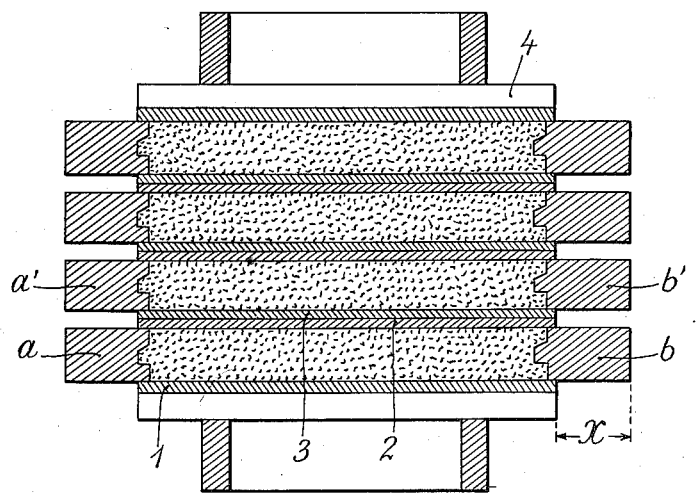
Figure 1 shows diagrammatically a vertical section through a stack of molds.

On a suitable support is placed a bottom board 1 having the same length, or somewhat more, than the plate to be manufactured. Then are placed in position side members $a$ and $b$ of the same length as said bottom board 1. These side members confine the longitudinal sides of the molding space and serve also as pistons during pressing of the plate. The outermost positions of the side members are controlled by stops (not shown). Into the now open mold is introduced material to be pressed. Then is placed over the mold an intermediate board 2, and suitably thereover still another intermediate board 3. Thereafter a new set of side members $a'$ and $b'$ is placed in position, and the new mold space thereby confined is filled with material to be pressed. This procedure is continued, until a desired number of filled molds are stacked upon each other. Upon the top mold is placed a top board 4. Then the stack of molds is pressed vertically so that the plates have the desired thickness. This position of the molds is then secured by any desired means which may be some planks or the like, which are arranged below and over the stack and are secured to each other by means of through bolt with nuts screwed thereon (not shown). Then the side members $a, b, a', b'$ etc. are pressed inwards simultaneously and to the same degree, preferably a distance $x$ as indicated on the right lower part of Figure 1. When the side members have been pressed in they are secured in position by means of vertically disposed planks or the like and bolts passing therethrough, or by a similar device (not shown). Then the entire body remains until the bonding agent has set, at which time the stack is opened and the plates are removed. If a flash occurs along the sides of the pressed plate it may easily be removed by milling or filing. As indicated on the drawing the side portions may be provided with grooves and tongues, which become very sharp and accurate by this pressure method.

Figure 2:
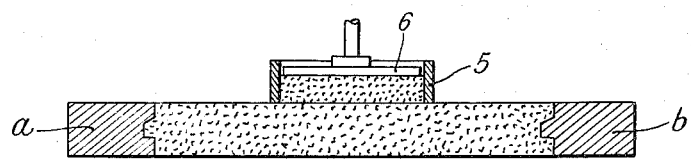
Figure 2 illustrates diagrammatically an auxiliary frame and an auxiliary pressure piston, which are used when filling the mold.

As mentioned above it is preferable to apply an excess of material at the center portion of the mold as compated to the sides thereof. In order that all molds shall be filled in an equal manner at the center it is advantageous to make use of a device shown diagrammatically in Figure 2. Over the end members of the open mold is placed an open frame 5, which extends longitudinally of the mold along the center portion thereof. Into this frame is filled a desired quantity of extra material, which latter is then pressed down into the mold below. The piston 6 and the frame 5 may then immediately be removed, since experience has shown that the mass originally contained in the frame will not expand too much. If the piston 6 is moved down some few centimeters below the top edge of the side member, the material will not expand more than to become flush with the top of said side members. Filling in of material along the sides of the mold may take place simultaneously as the filling of the auxiliary frame 5.

I claim:

1. A method of manufacturing a cement-fibre mass adapted for building construction, which includes the steps of confining the mass within a form to have face surfaces and smaller side surfaces, and subjecting the mass which consists of a liquid mixture of a bonding agent and strips of fibrous material having a cross-section the width of which is substantially greater than its thickness to a compressive force in a direction parallel to the face surfaces of the mass so as to orient the width dimension of the fibre strips substantially perpendicular to said face surfaces of the mass.

2. Method according to claim 1 wherein the width of the respective fibre strips is at least twice as great as the thickness of the strip.

3. Method according to claim 2 wherein the compressive force is exerted from a side surface of the mass.

4. Method according to claim 2 wherein the compressive force is exerted simultaneously from two opposite side surfaces of the mass.

SVERRE WILFRED EVENSEN.

REFERENCES CITED

The following references are of record in the file of this patent:

UNITED STATES PATENTS

| Number | Name | Date |
|---|---|---|
| 2,120,268 | Schuh | June 14, 1938 |
| 2,377,484 | Elmendorf | June 5, 1945 |
| 2,476,653 | Elberty, Jr. | July 19, 1949 |